UNITED STATES PATENT OFFICE.

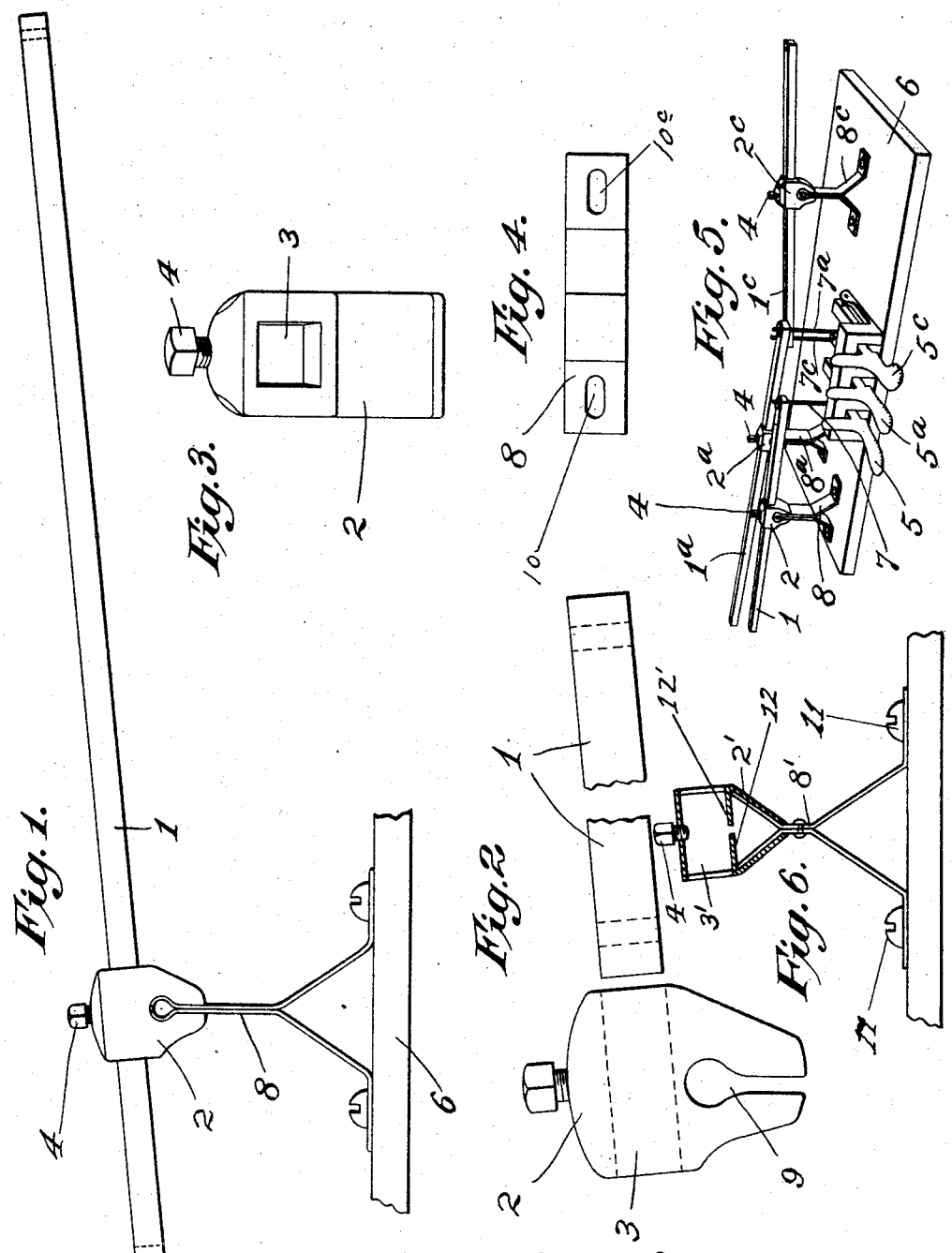

CHARLES RAMSEY, OF NEW YORK, N. Y.

UPRIGHT-PIANO-PEDAL MOUNTING.

1,188,101.  Specification of Letters Patent.  Patented June 20, 1916.

Application filed June 17, 1910. Serial No. 567,523.

*To all whom it may concern:*

Be it known that I, CHARLES RAMSEY, a citizen of the United States, and resident of New York city, in the county of New York and State of New York, have invented certain new and useful Improvements in Upright-Piano-Pedal Mountings, of which the following is a specification.

This invention relates to improvements in the pedal action or "trap work" so-called, of an upright piano.

The object of the invention is to supply a convenient mounting for the pedal levers of upright pianos, and to reduce the cost of such trapwork. This object I attain in the manner and by the mechanism hereinafter described, reference being had to the accompanying drawings, in which—

Figure 1 shows my improved pedal lever, with the metal lever holder and metal spring mounting. Fig. 2 shows my improved metal holder or block, and the adjustable lever removed therefrom. Fig. 3 shows an end view of the block shown in Fig. 2. Fig. 4 is a plan view of the under side of the bracket spring, connecting the block with the bottom board. Fig. 5 shows my improved pedal mounting complete, fixed to the bottom board of the piano and connected to the pedals. Fig. 6 shows a modification in construction of my improved pedal lever block.

Similar reference marks refer to similar parts throughout the several drawings.

The numeral 1 shows my adjustable pedal lever, usually made of square metal rod. At 2, 2ª and 2ᶜ Fig. 5, is shown the metal lever block or holder, through which is a hole or slot 3, adapted to receive the levers 1, 1ª and 1ᶜ. The levers 1, 1ª and 1ᶜ are held at any point set in their respective block or holder 2, 2ª and 2ᶜ by the set screw 4.

At 5, 5ª and 5ᶜ are shown the three pedals— soft, muffled and loud,—attached to the bottom board 6 in the usual way; the adjustable connections connecting the levers 1, 1ª and 1ᶜ with the pedals 5, 5ª and 5ᶜ, are shown at 7, 7ª and 7ᶜ. At 8, 8ª and 8ᶜ are shown my pivotal spring mountings or brackets for holding the lever blocks 2, 2ª and 2ᶜ. Preferably this bracket is made of flat steel, with the two spreading arms or legs fixed to the bottom board securely as shown; and the upper ends are fixed to the blocks 2, 2ª and 2ᶜ by being forced into the slot 9 (see Fig. 2) the upper part of said slot being enlarged or rounded so as to take in the rounded or expanded top of the steel bracket. The stress of spring brackets on the levers, or upward pull on the pedals may be increased or diminished as desired, by moving the bracket 8, 8ª on 8ᶜ to or from the pedals.

In the modification shown in Fig. 6 I make the block 2' of stamped sheet metal, the hole 3' being formed by turning down inwardly a part of the sides 12 and 12', thus forming a rest for the pedal lever, as shown in the drawing.

A great advantage in my invention is the time saved in attaching and adjusting the pedal mountings, as the lever readily slips through the block (2, 2ª or 2ᶜ); and the proper stress of the spring brackets is obtained without disconnecting either end of the levers (1, 1ª or 1ᶜ) from the pedals below or muffler rail above,—the oblong screw holes 10 and 10ᶜ in the bottom of bracket 8 (see Fig. 4) allowing this movement by simply loosening the screws 11 (see Fig. 6), so that the bracket 8 may be moved along the bottom board 6, either farther from or nearer to the pedals—thus diminishing or increasing the pressure required on the pedals, as may be desired.

Having thus described my invention, what I claim as new and original and desire to secure by Letters Patent, is—

1. In an upright piano pedal mounting, the combination of the spring bracket 8, with the block 2 fixed to said bracket and having the hole 3 therein; the set screw 4 fixed to said block; and the movable lever 1, arranged to be held in place in said block by the said set screw 4.

2. In an upright piano pedal mounting, the bracket 8' having two horizontal and two vertical members; and a fixed sheet metal top surmounted thereon, with an opening therethrough; in operative combination with a movable lever adjustable in said opening and arranged to be set at any predetermined point and held firmly in place by the set-screw 4.

Signed at New York in the county of New York and State of New York, this 4th day of June A. D. 1910.

CHARLES RAMSEY.

Witnesses:
LULU G. GADSDEN,
DOWNING VAUX.